United States Patent
Jordan et al.

(10) Patent No.: US 10,027,097 B1
(45) Date of Patent: Jul. 17, 2018

(54) CRIMP-ON SINGLE-USE LANYARD ASSEMBLY FOR WIRE-PULLING PURPOSES

(71) Applicants: David S. Jordan, Knoxville, TN (US); Michael C. Jordan, Knoxville, TN (US)

(72) Inventors: David S. Jordan, Knoxville, TN (US); Michael C. Jordan, Knoxville, TN (US)

(73) Assignee: iTool Equipment Holding LLC, Oak Ridge, TN (US)

( * ) Notice: Subject to any disclaimer, the term of this patent is extended or adjusted under 35 U.S.C. 154(b) by 0 days.

(21) Appl. No.: 14/120,130

(22) Filed: Apr. 28, 2014

(51) Int. Cl.
*G02B 6/44* (2006.01)
*H02G 1/08* (2006.01)
*H01R 4/18* (2006.01)

(52) U.S. Cl.
CPC ........... *H02G 1/081* (2013.01); *G02B 6/4465* (2013.01); *H01R 4/188* (2013.01); *Y10T 29/49181* (2015.01); *Y10T 29/49826* (2015.01)

(58) Field of Classification Search
CPC . H02G 1/04; H02G 1/08; H02G 1/081; B25B 25/00; E04C 5/165; G02B 6/4465; Y10T 29/49945; Y10T 24/39; Y10T 29/49826
USPC ................ 254/134.3 R, 134.3 PA, 134.3 CL, 254/134.3 SC, 134.3 FT; 385/136
See application file for complete search history.

(56) References Cited

U.S. PATENT DOCUMENTS

| | | | | |
|---|---|---|---|---|
| 1,326,008 A | * | 12/1919 | Tarbox | F16C 11/0647 29/896.7 |
| 2,577,167 A | * | 12/1951 | Vlasis | A42C 3/00 223/25 |
| 2,619,860 A | * | 12/1952 | Gray, Jr. | B25B 13/481 464/30 |
| 2,679,414 A | * | 5/1954 | Hornschuch | F16D 1/02 403/307 |
| 2,962,129 A | * | 11/1960 | Walton | F16G 11/06 403/286 |
| 3,551,959 A | * | 1/1971 | Mastalski | F16G 11/04 174/79 |

(Continued)

OTHER PUBLICATIONS

Wire Snagger(R) 2009 catalogue—Wire Pulling Tool for all cable jackets including non-lube; Rectorseal Co.; edition 2009.*

(Continued)

*Primary Examiner* — Christopher M Koehler
*Assistant Examiner* — Mahdi H Nejad
(74) *Attorney, Agent, or Firm* — Michael E. McKee (57) ABSTRACT

A crimp-on single-use lanyard assembly which includes a cord portion and an elongated, hollow wire-accepting connector body connected to the cord portion utilizes a connector body which includes a window through which a user can visually determine whether the wire has been inserted endwise into the interior of the connector body by a predetermined distance or, more specifically, to a near fully-accepted position within the connector body. In addition, the hollow interior of the connector body has a coarse surface provided with a plurality of projections disposed thereacross so that when the connector body is crimped about the inserted wire, the projections of the coarse surface bite into the wire and thereby enhances the grip of the connector body about the inserted wire.

13 Claims, 4 Drawing Sheets

(56) References Cited

U.S. PATENT DOCUMENTS

| | | | | |
|---|---|---|---|---|
| 3,594,713 | A * | 7/1971 | Thoman | H01R 4/206 439/730 |
| 4,169,310 | A * | 10/1979 | Murphy | H01R 43/033 140/124 |
| 4,189,249 | A * | 2/1980 | Gaines | B62D 7/20 228/178 |
| 4,488,738 | A * | 12/1984 | Valdes | F16L 15/001 285/251 |
| 4,939,831 | A * | 7/1990 | Doninger | B25B 27/023 29/263 |
| 5,271,415 | A * | 12/1993 | Foerster | A61M 25/0905 600/434 |
| 5,422,438 | A * | 6/1995 | Lamome | H01R 4/203 174/76 |
| 5,561,900 | A * | 10/1996 | Hosler, Sr. | H01R 24/542 174/75 C |
| 5,746,555 | A * | 5/1998 | McEvoy | E04C 5/165 403/307 |
| 5,938,180 | A * | 8/1999 | Walsten | H02G 1/083 254/134.3 FT |
| 6,004,172 | A * | 12/1999 | Kerek | H01R 13/04 439/879 |
| 6,726,510 | B2 * | 4/2004 | Norbert | H01R 4/36 174/135 |
| 6,838,620 | B2 * | 1/2005 | Murakami | H01R 4/206 174/84 C |
| 6,893,301 | B2 * | 5/2005 | Kuwayama | H01R 4/188 439/877 |
| 6,948,955 | B2 * | 9/2005 | Ducrot | H01R 4/36 439/149 |
| 7,394,022 | B2 * | 7/2008 | Gumley | H01R 4/206 174/84 C |
| 7,478,794 | B1 * | 1/2009 | Gohlke | B66C 1/42 254/134.3 FT |
| 7,703,990 | B1 * | 4/2010 | de Jong | G02B 6/4471 385/100 |
| 8,397,738 | B2 * | 3/2013 | Livacich | E04H 15/001 135/114 |
| 8,519,267 | B2 * | 8/2013 | Peters | H01R 4/203 174/122 C |
| 8,657,259 | B2 * | 2/2014 | Pagliaroli | H02G 1/081 254/134.3 FT |
| 8,789,327 | B2 * | 7/2014 | Junes | E04B 1/215 52/251 |
| 9,033,751 | B2 * | 5/2015 | Sato | H01R 4/188 439/877 |
| 2007/0001157 | A1 * | 1/2007 | Quick | H02G 1/081 254/134.3 FT |
| 2007/0264873 | A1 * | 11/2007 | Kakuta | H01R 4/185 439/585 |
| 2008/0217055 | A1 * | 9/2008 | Gumley | H01R 4/206 174/84 C |
| 2008/0289874 | A1 * | 11/2008 | Good | H01R 4/184 174/84 C |
| 2011/0140058 | A1 * | 6/2011 | Pagliaroli | H02G 1/081 254/134.3 FT |
| 2014/0235111 | A1 * | 8/2014 | Duncan | H02G 1/083 439/801 |
| 2017/0229793 | A1 * | 8/2017 | Schmidt | H01R 4/5033 |

OTHER PUBLICATIONS

RectorSeal Single Use Wire Grabber catalogue; 2015.*
Rectorseal—EncoreWire catalogue.*
iTOOLco_WindowCrimps catalogue.*
Southwire MAXIS® GRIPS# Pulling Heads; 2015.*
Encore Wire Itoolco. Window Crimp with Sure Grip; 2015.*
RectroSeal Electrical_web(2013 catalogue).*
Anixter Single-Use Pulling Eye Solution.*
150818_FL_ITOOLCO_12TonCrimper.*
Single-Use Wire Grabber from RectorSeal(R) YouTube: https://www.youtube.com/watch?v=2NWGhJlvTXY Published Jan. 2, 2013.*
RectorSeal Single Use Lanyard (pictures used in office action); Jan 2, 2013; www.youtube.com/watch?v=2NWGhJlvTXY.*
RectorSeal Single Use Lanyard Wire Grabber at https://www.youtube.com/watch?v=2NWGhJlvTXY.*

* cited by examiner

CRIMP-ON SINGLE-USE LANYARD ASSEMBLY FOR WIRE-PULLING PURPOSES

BACKGROUND OF THE INVENTION

This invention relates generally to means and methods for pulling wire between two sites and relates, more particularly, to a single-use lanyard assembly which is capable of being crimped about one end of a wire for wire-pulling purposes.

The class of lanyard assemblies with which this invention is to be compared includes those having a cord portion to which a pulling device can be connected and a wire-accepting connector which is joined to the cord portion. The connector has a body which is elongated in shape and has an opening formed in one end of the body for accepting one end of a wire to be pulled. Once an end of the wire is positioned within the connector body, the connector body is crimped, or swaged, about the wire end to secure the connector body to the wire end. The connector body, with the wire end crimped therein, can thereafter be pulled upon, by way of the cord portion, to pull the wire in an endwise, or longitudinal, direction.

Unless the inserted wire end is fully accepted by the connector body when the connector body is crimped thereabout, the surface area of the wire being crimped, or mashed between, the crimped connector body may not be maximized which could, in turn, reduce the wire-pulling capacity of the lanyard assembly. However, the construction of the connector bodies of conventional lanyard assemblies renders it difficult to readily determine whether a wire end is fully accepted by the connector body before the connector body is crimped about the wire end.

It would be desirable to provide a lanyard assembly which enables a user to readily determine whether or not an end of a wire to be pulled is fully or near fully-accepted by the body of the connector before the wire is crimped about the accepted wire end. It would also be desirable to provide a lanyard assembly whose features improve the wire-pulling capacity of the lanyard assembly, once the connector body is crimped about a wire end.

Accordingly, it is an object of the present invention to provide a new and improved lanyard assembly of the aforedescribed class.

Another object of the present invention is to provide such a lanyard assembly which provides a user with means for readily determining whether or not an end of a wire to be pulled is fully or near-fully accepted by the body of the connector before the connector body is crimped about the wire end.

Still another object of the present invention is to provide such a lanyard assembly which enables a user to visually determine whether or not a wire end portion has been inserted endwise into the connector body by a target, or predetermined, distance.

Yet another object of the present invention is to provide such a lanyard assembly whose features improve upon the wire-pulling capacity of the assembly, once the connector body has been crimped about a wire end.

A further object of the present invention is to provide such a lanyard assembly which is uncomplicated in structure, yet effective in operation.

SUMMARY OF THE INVENTION

This invention resides in an improvement to a crimp-on single-use lanyard assembly including a cord portion and an elongated cable-accepting connector connected to the cord portion wherein the connector includes a body having a hollow interior including an end opening which opens out of the body at one end thereof and into which a wire is inserted endwise into the connector body for purposes of crimping the connector about the cable.

The improvement is characterized in that the connector body includes a window through which a user can visually determine whether the wire has been inserted endwise into the interior of the connector body by a predetermined distance.

In a particular embodiment of the improvement, the hollow interior of the connector body defines a plurality of projections disposed thereacross so that when the connector body is crimped about the inserted wire, the projections bite into the wire and thereby enhances the grip of the crimped connector body about the inserted wire.

DETAILED DESCRIPTION OF AN ILLUSTRATIVE EMBODIMENT

Figure 1:
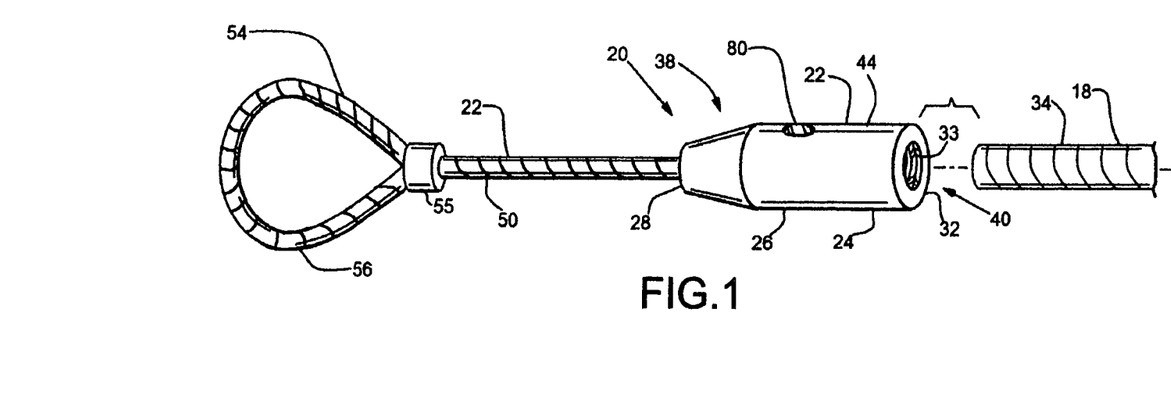
FIG. 1 is a perspective view of an embodiment of a crimp-on single-use lanyard assembly within which features of the invention are embodied and a wire cable whose end is desired to be crimped within and pulled endwise with the lanyard assembly.
Figure 2:
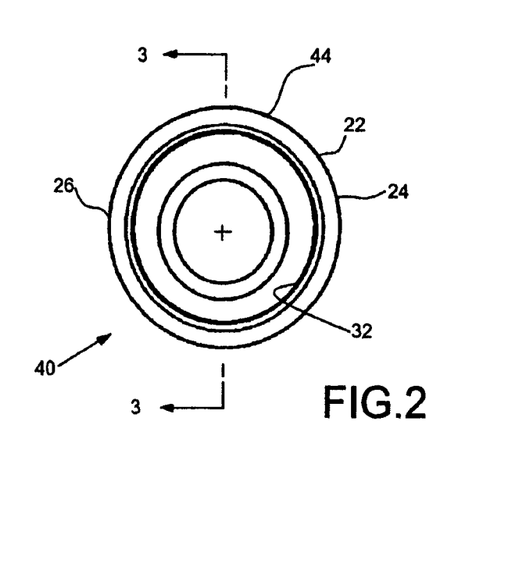
FIG. 2 is an end elevational view of the connector body of the FIG. 1 lanyard assembly as seen generally from the right in FIG. 1.
Figure 3:
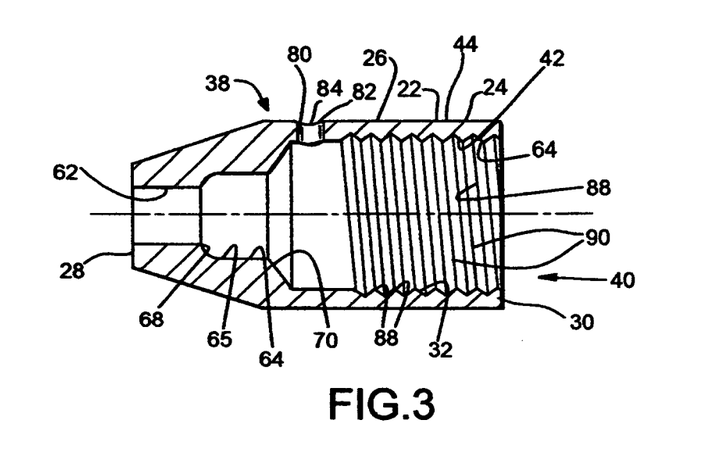
FIG. 3 is a longitudinal cross-sectional view of the FIG. 2 connector body taken about line 3-3 of FIG. 2.

Turning now to the drawings in greater detail and considering first FIG. 1-3, there is illustrated an embodiment, generally indicated 20, of a lanyard assembly within which features of the present invention are embodied and a wire, or wire cable, 18 which is desired to be crimped within and pulled upon with the lanyard assembly 20 in an endwise direction which corresponds generally to the longitudinal axis of the wire 18. Briefly, the depicted lanyard assembly 20 includes a cord portion 22 to which a suitable pulling device, or wire puller, (e.g. not shown) can be secured for the purpose of pulling the assembly 20 and an elongated connector 24 to which the cord portion 22 is secured. The connector 24 includes a body 26 having two opposite ends 28, 30 and a hollow interior 32 which extends between the ends 28, 30. The hollow interior 32 has an end opening 33 at one end 30 of the connector body 26 which opens out of the body end 30 and is adapted to accept an end portion, indicated 34, of the wire 18 which is inserted endwise into the connector body 26 to a fully-accepted position therein at which the connector body 26 can be crimped, or swaged, about the wire end portion 34. Although the connector body 26 is comprised of metal, it is commonly a relatively soft metal, such as aluminum, to permit the body to be crimped about the wire 18 with relative ease.

As will be apparent herein and with reference still to FIGS. 1-3, the connector body 26 includes means, generally indicated 38, enabling a user to visually determine whether or not the wire end portion 34 has been inserted endwise into the connector body 26 by a target, or predetermined, distance. In practice, the target distance that the wire end portion 34 is desired to be inserted into the connector body 26 is sufficient to ensure that when the connector body 26 is subsequently crimped about the wire end portion 34, the surface area of the wire end portion 34 being crimped within the connector body 26 is substantially maximized. In addition, the connector body 26 also includes projection-defining means, generally indicated 40, associated with the interior 32 of the connector body 26 for enhancing the gripping engagement between the surfaces, indicated 42, of the connector body interior 32 and the exterior surface, indicated 44, of the wire end portion 34 when the connector body 26 is crimped about the wire end portion 34.

Figure 4:
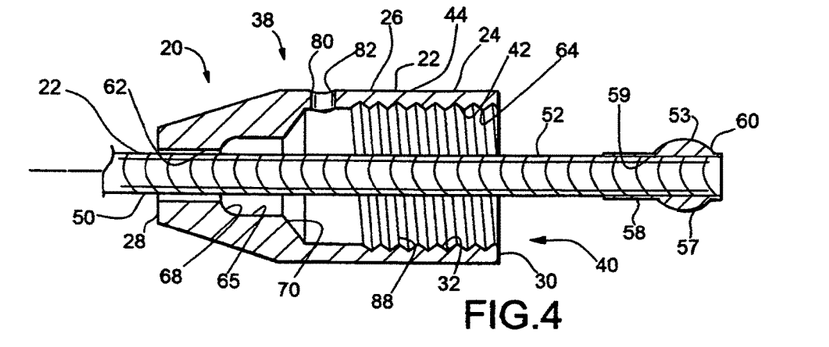
FIG. 4 is a longitudinal cross-sectional view of the connector body of the FIG. 1 lanyard assembly and an end of the cord portion which is secured within the connector body.

With reference to FIGS. 1 and 4, the cord portion 22 is comprised of a length of steel cable 50 having one end portion 52 to which a metal bolus 53 is attached and another end portion 54 opposite the one end 52 which is looped back upon and secured to itself with a metal band 55 to form a loop 56. As best shown in FIG. 4, the metal bolus 53 has a rounded portion 57 and a shank 58 which extends from one side of the rounded portion 57. A through-opening 59 is defined through the rounded portion 57 and shank 58, and the cable end portion 52 is secured within the through-opening 59. To this end, the cable end portion 52 is positioned within the through-opening 59 and the shank 58 is swaged about the cable end portion 52 to firmly secure the bolus 53 thereabout. The rounded portion 57 of the bolus 53 provides the cord portion 22 with an enlarged end portion 60, and as will be apparent herein, the enlarged end portion 60 of the cable 50 is positioned within and cooperates with the connector body 26 to prevent the withdrawal of the cord portion 22 from the connector body 26 through the end 28 thereof.

With reference again to FIGS. 1-3, the exterior surface 44 of the connector body 26 is substantially cylindrical in form along a major portion of the length of the body 26. Meanwhile, the hollow interior 32 of the body 26 extends axially along the full length of the body 26 and opens out of the body 26 at each of its ends 28 or 30. In addition, the hollow interior 32 includes a first region 62 adjacent the body end 28 which is substantially circular in cross section as a path is traced along the length of the hollow interior 32 from the body end 28, and the hollow interior 32 includes a second, or wire-accepting, region 64 adjacent the body end 30 which is also substantially circular in cross section as a path is traced along the hollow interior 32 from the body end 30. The diameter of the first region 46 is large enough to accept the cable 50 of the cord portion 22 disposed therein yet is small enough to prevent the passage of the enlarged end portion 60 axially therethrough. Meanwhile, the diameter of the second region 64 is sized to closely accept the end portion 34 of the wire 18 when the wire end portion 34 is inserted endwise therein.

At the end of the first region 62 opposite the body end 28, the hollow interior 32 includes an intermediate region 65 having a cross section which is slightly larger in diameter than that of the first region 62 and which has a rounded end section 68 adjacent the first region 62 which serves as a seat for the enlarged end portion 60 or, more specifically, the rounded portion 57 of the bolus 53 when the cord portion 22 is pulled axially of the hollow interior 32 from the loop 56 thereof. Furthermore, the hollow interior 32 includes a transition region 70 of substantially conical shape and which joins the second region 64 to the intermediate region 66. As best shown in FIG. 3, the diameter of the transition region 70 decreases in size as a path is traced therealong from the second region 64 to the intermediate region 66.

As will be apparent herein, the surface of the transition region 70 provides an abutment surface 72 against which the wire end portion 34 is adapted to abut when the wire end portion 34 is fully inserted endwise into the hollow interior 32 through the connector body end 30 and beyond which the wire end portion 34 cannot be inserted endwise any further into the hollow interior 32. In addition and as a pulling operation is performed with the lanyard assembly 20, the transition region 70 funnels, or directs, the enlarged end portion 60 of the cord portion 22 axially along the length of the transition region 70 from the cable body end 30 until the enlarged end portion 60 becomes seated within the rounded section 68 of the intermediate region 65. In other words, the transition region 70 acts as a centering passageway which funnels, or directs, the rounded portion 57 of the bolus 53 axially of the hollow interior 32 into a seated condition against the rounded section 68 of the intermediate region 65.

With reference again to FIGS. 1-3, it is a feature of the lanyard assembly 20 that its enabling means 38 enables a user to visually determine whether the end portion 34 of the wire 18 has been inserted endwise into the hollow interior 32 through the end opening 33 by a target, or predetermined, distance along the length of the hollow interior 32 so that when the connector body 26 is subsequently crimped about the wire end portion 34, a relatively large amount of surface area of the wire end portion 34 is crimped, or mashed, between the interior surface 42 of the connector body 26.

Within the depicted embodiment 20, the enabling means 38 includes a window 80 defined within one side of the connector body 26 which enables a user to visually determine whether the wire end portion 34 has been inserted endwise into the connector body 26 through the end opening 33 thereof to a position therein at which the wire end portion 34 is either fully-accepted or nearly fully-accepted by the second (i.e. wire-accepting) region 64 of the connector body 26. That is to say, the window 80 enables the user to visually determine whether the wire end portion 34 has been inserted endwise into the connector body 22 to a location within the hollow interior 32 which is viewable through the window 80.

In practice and since the window 80 is spaced from the end opening 33 by a preselected distance (e.g. 1.75 inches) and a viewer is able to visually determine (by looking through the window 80) whether the wire end portion 34 has been inserted into and along the hollow interior 32 of at least as far as the preselected distance, the aforementioned predetermined distance is substantially equal to the preselected distance.

Within the depicted embodiment 20, the window 80 is provided by a two-ended passageway 82 which opens at one end out of the exterior surface 44 of the connector body 26 and opens at its other end along the interior surface 42 of the connector body 26. The passageway 82 is provided by a bore 84 (FIG. 3) of substantially circular cross section formed in one side of the connector body 26, but passageways of other cross-sectional shapes can be had. By way of example, the bore 84 has a diameter of about 0.25 inches, but the diameter of the bore 84 can be any of a number of alternative sizes as long as the user can see the wire end portion 34 through the window 80 when the wire end portion 34 is disposed at a desired location along the length of the second (i.e. wire-accepting) region 64, such as a location at which the wire end portion 34 is disposed adjacent the abutment surface 72.

Preferably, the window 80 enables a user to visually determine whether the wire end portion 34 has been inserted endwise along the second, or wire-accepting, region 64 to a position therealong at which the wire end portion 34 has been fully or near-fully inserted along the length of the second region 64. Accordingly and in order for the user to visually determine whether the wire end portion 34 has been inserted into close proximity to the abutment surface 72 (beyond which the wire end portion 34 cannot be inserted further into the connector body 26), the window 80 is disposed along the connector body 26 so that the user can visually make that determination. In this connection and within the depicted embodiment 20, the window 80 is disposed along the length of the connector body 26 so that the user can determine whether the wire end portion 34 has been inserted through the end opening 33 and along the second region 64 to within about 0.125 inches of the abutment surface 72. Consequently and to this end, the center of the window 80 is formed within (and through one side of) the portion of the connector body 26 which encircles the second region 64 (i.e. the wire-accepting portion) of the hollow interior 32 and is disposed at a location therealong which is about 0.375 inches from the abutment surface 72.

Figure 5:
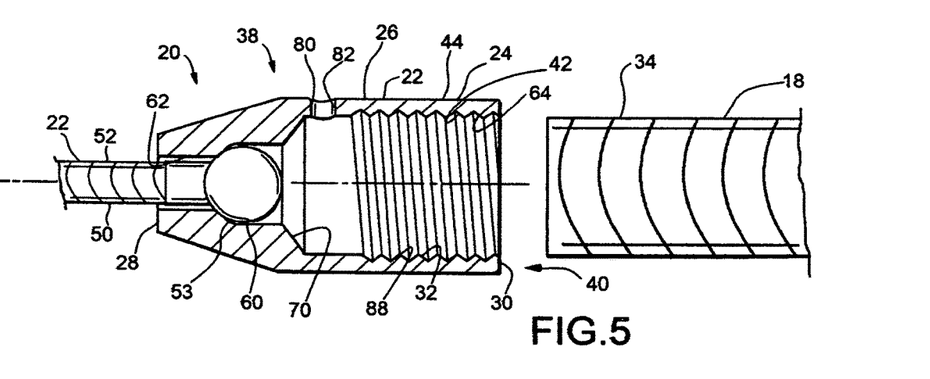
FIGS. 5-7 are views similar to that of FIG. 4 depicting a sequence of events terminating in the crimping of the FIG. 1 lanyard assembly about an end of the FIG. 1 wire cable.
Figure 6:
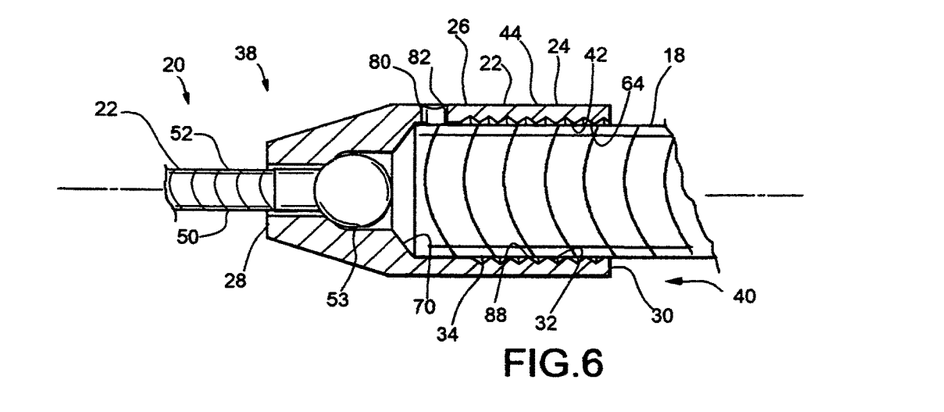
Figure 7:
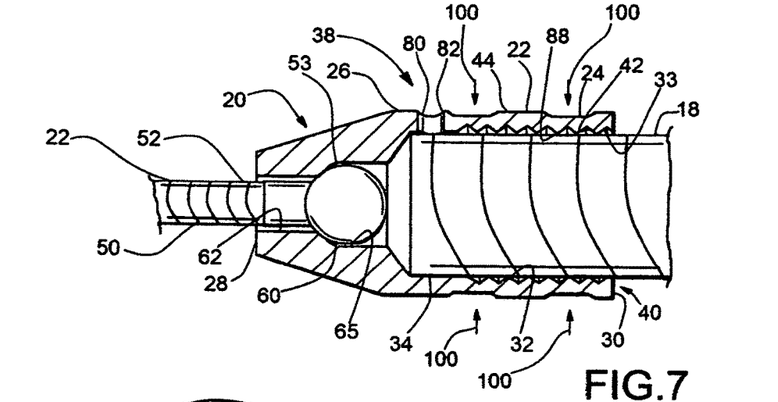
Figure 8:
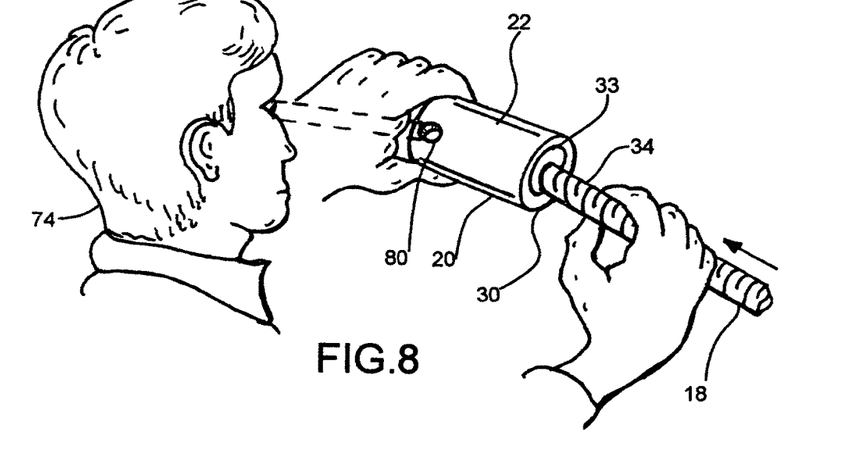
FIG. 8 is a perspective view of the lanyard assembly and wire cable of FIG. 1 in which the wire cable is being inserted endwise into the connector body of the lanyard assembly by a user.

In preparation of a wire-pulling operation to be performed with the lanyard assembly 20, the end portion 34 of the wire 18 is axially aligned with the connector body 26 at the end opening thereof as illustrated in FIG. 5. Then, the wire end portion 34 is inserted endwise into the connector body 26 through the end opening 33 thereof until the wire end portion 34 abuts or is positioned in relatively close proximity to the abutment surface 72 as illustrated in FIG. 6. With the wire end portion 34 disposed within the connector body 26 (when in the FIG. 6 position), an appreciable region of the exterior surface 44 of the connector body 26 is crimped, or swaged, about the wire end portion 34 (through the application of radially inwardly-directed forces applied to the exterior of the connector body 26 along the directions indicated by the FIG. 7 arrows 100) so that the interior surface 42 of the connector body 26 is crimped, or mashed against, the exterior surface of the wire end portion 34 as best illustrated in FIG. 7. It follows that as the wire end portion 34 is being inserted into the connector body 26, the user 74 (FIG. 8) can observe the approach of the wire end portion 34 toward the abutment surface 72, as is depicted in FIG. 8.

An advantage provided by the window 80 is that it enables a user to visually ensure that the wire end portion 34 has been inserted into the connector body 26 to either a fully or nearly fully-inserted condition within the second region 64 of the hollow interior 32 before the body 26 is crimped about the wire end portion 34. By visually ensuring that the wire end portion 34 has been inserted endwise into the connector body 26 to such a condition before the connector body 26 is crimped about the wire end portion 34, the likelihood is increased that the subsequent crimping of the connector body 26 about the wire end portion 34 will result in the maximization of the surface area of the wire end portion 34 being crimped within the interior surface 42 of the connector body 26.

Figure 9:
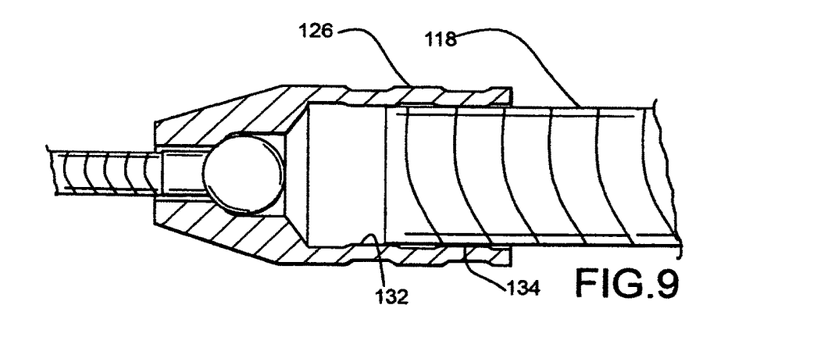
FIG. 9 is a view similar to that of FIG. 7 of another lanyard assembly and wire cable, but depicting the disposition of the wire cable which has not been fully inserted within the connector body of the lanyard assembly before the connector body has been crimped about the wire cable.

The aforedescribed advantage provided by the window 80 can be readily appreciated when considering the possible crimping of a connector body of a lanyard assembly about a wire end portion 34 which has not been fully, or nearly fully, positioned within the interior of the connector body. For example, there is depicted in FIG. 9 an example of a window-less connector body 126 (having a relatively smooth interior surface 132) within which a wire 118 whose wire end portion 134 has been only partially (e.g. almost one-half-way) inserted endwise within the connector body 126 before being crimped thereabout. Since the wire end portion 134 is positioned so far from a fully-inserted condition within the connector body 122 before being crimped within the connector body 122, there is much less surface area (e.g. roughly only about one-half of the possible surface area) of the wire end portion 134 which is crimped within the interior surface 132 of the connector body 126. Thus, the window 80, such as is provided in the connector body 22 of the embodiment 20 of FIGS. 1-7, enables a user to visually confirm (before the connector body has been crimped about the wire end portion) that the inserted wire end portion has been either fully-inserted or nearly fully-inserted into the connector body 26 and thereby reduces any likelihood that the connector body will be subsequently crimped about the wire end portion before the wire end portion has been inserted to a desired position within the connector body 26 for crimping purpose, and applicants' invention is advantageous in this respect.

With reference again to FIGS. 3-7, it is also a feature of the embodiment 20 that the projection-defining means 40, introduced above, includes a plurality of projections 88 disposed across the surface 42 of the connector body interior 32 so that when the connector body 26 is crimped about the wire end portion 24, the projections 88 effectively bite into the surface of the wire end portion 34 and enhance the frictional gripping engagement between the interior surface 42 of the connector body 26 and the exterior surface of the wire end portion 34. The projections 88 are preferably provided by a coarseness of the surface 42. In other words, the projections 88 are a consequence of the coarse, or rough, nature of the surface 42.

While the coarseness of the surface 42 (and the projections 88 resulting therein) can be induced or formed within the hollow interior 32 in any of a number of ways (such as the formation of grooves therealong or the creation of coarseness through a chemical etching technique), within the depicted embodiment 20, the coarse interior surface 42 (with its projections 88 disposed thereacross) is disposed within the second region 64 of the connector body 26 and is provided by a series of internal threads 90 which extend for a substantial distance along the length of the second region 64 from the end opening 33 of the connector body 26, and it is the edges of these threads 90 which provide the projections 88 of the coarse interior surface 42. When the connector body 22 is crimped about a wire end portion 34 which has been fully, or nearly fully, inserted within the hollow interior 32 of the connector body 26, the projections 88 of the coarse interior surface 42 effectively bite into the outer surface of the inserted wire end portion 34 and thereby enhance the grip of the connector body 22 about the wire end portion 34. Moreover, the coarseness of the surface 42 provides a greater amount of exposed surface than is provided by a smooth surface of the same size, and it is believed that this greater amount of exposed surface area (capable of contacting the wire end portion 34 when crimped thereabout) also contributes to the enhanced grip of the connector body 26 about the wire end portion 34. In any event, the enhancing of the grip of the wire end portion 34 by the coarse interior surface 42 of the connector body 26 has been found to increase the load-pulling capacity of the connector body over one which has a relatively smooth interior surface, and the coarse surface 42 is advantageous in this respect.

Figure 10:
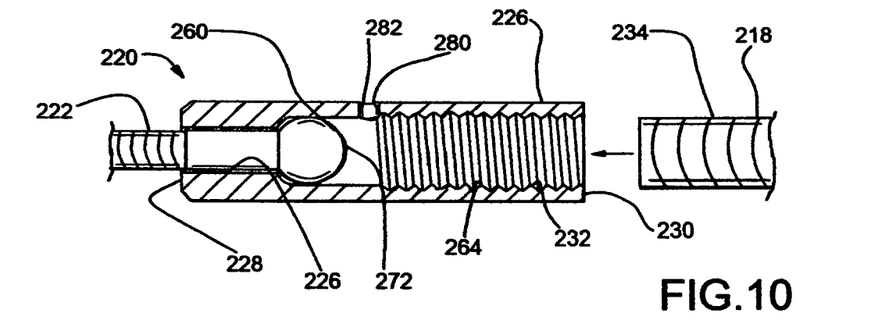
FIG. 10 is a view similar to that of FIG. 5 of an alternative crimp-on single-use lanyard assembly within which features of the present invention are embodied.

It will be understood that numerous modifications and substitutions can be had to the aforedescribed embodiment 20 without departing from the spirit of the invention. For example, although the aforedescribed embodiment 20 has been shown and described as including a hollow interior 32 which possesses a transition region 70 (FIG. 3) therealong which helps to center the enlarged end portion 60 of a cord portion 22, an embodiment of a lanyard assembly within which the features of the present invention are embodied may not possess such a transition region. For example, there is depicted in FIG. 10 an embodiment, generally indicated 220, of a lanyard assembly having a cord portion 222 and a window-bearing connector body 226 which is adapted to be crimped about the wire end portion 234 of a wire 218 and wherein the connector body 226 has a hollow interior 232 which possesses a first region 262 which extends axially inwardly of the body 226 from one end, indicated 228, thereof and a second region 264 which extends axially into the body 226 from the opposite end 230 thereof but does not possess any transition region disposed between the first and second regions 262 and 254 for centering the rounded end portion, indicated 260 of the cord portion 222 when the cord portion 222 is pulled endwise through the connector body end 228. Within the lanyard assembly 220 of FIG. 10, an abutment surface, indicated 272, within the connector body 222 which serves as the abutment surface against which the wire end portion 234 is positioned when fully inserted therein is provided by the enlarged end portion 260 of the cord portion 222. Accordingly and in accordance with the present invention, the window, indicated 280, provided within one side of the connector body 226 is provided by a passageway 282 disposed along the length of the portion of the connector body 226 and is located within, for example, about 0.125 inches from the enlarged end portion 260 when the enlarged end portion 260 is seated within, or pulled into, its depicted FIG. 10 position within the connector body 226.

Figure 11:
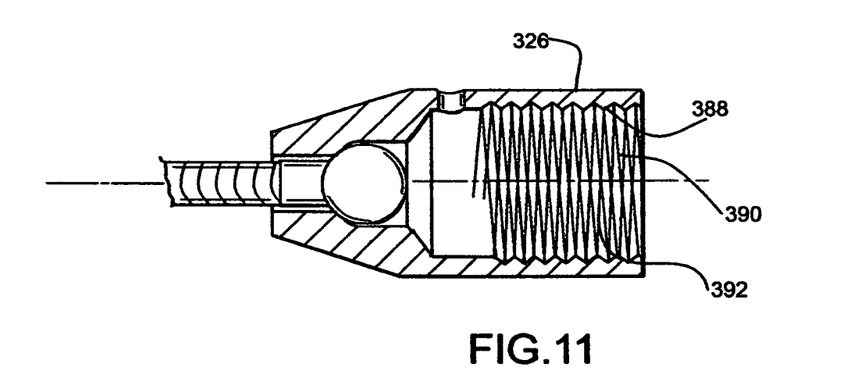
FIG. 11 is a view similar to that of FIG. 5 of still another crimp-on single use lanyard assembly within which features of the present invention are embodied.

Furthermore and although the ridges 88 of the knurled interior surface 42 of the connector body 22 has been shown and described as being provided by the edges of internal threads 90, the ridges 88 can take an alternative form. For example, there is illustrated in FIG. 11, a window-providing connector body 326 having a knurled interior surface 342 whose ridges, indicated 388, are provided by edges 386 formed from a series of counter-clockwise-directed internal threads 390 and a series of clockwise-directed internal threads 392 being formed therein.

Accordingly, the aforedescribed embodiment 20 is intended for the purpose of illustration and not as limitation.

The invention claimed is:

1. In a crimp-on single-use lanyard assembly including a cord portion and a wire-accepting connector connected to the cord portion wherein the connector includes an elongated body having two opposite ends and having a hollow interior including an end opening which opens out of the body at one end thereof and into which a wire is inserted endwise into the hollow interior of the connector body for purposes of crimping the connector body about the wire wherein the crimping of the connector body about the wire alters a shape of the connector body from an undeformed condition to a deformed condition, an improvement characterized in that:

the connector body includes a longitudinal axis and defines an exterior surface which extends along a length of the connector body from the end opening thereof and includes a window which extends from the hollow interior of the connector body and opens out of the exterior surface thereof and through which a user can visually determine whether the wire has been inserted endwise into the hollow interior of the connector body by a predetermined distance;

wherein the window is disposed along the length of the connector body at a location along the length of the connector body which is capable of being crimped about the wire and which is spaced from the end opening by the predetermined distance;

wherein the exterior surface of the connector body extends between the two opposite ends of the connector body, and the window is provided by a passageway which communicates between the exterior surface and the hollow interior of the connector body, and the window-providing passageway is of such a configuration that the wire can be seen through the window-providing passageway when the wire has been inserted through the end opening and along the hollow interior of the connector body by a distance which is at least as great as the predetermined distance and wherein the connector body is adapted to cooperate with the wire when the connector body is crimped thereabout so that the wire and the connector body are prevented from being rotated relative to one another; and wherein the hollow interior of the connector body is sized to closely accept the wire inserted endwise therein through the end opening of the connector body so that upon the crimping of the connector body to the deformed condition about the wire to thereby secure the wire within the connector body, neither the exterior surface of the connector body nor the window is deformed to such an extent that the wire cannot be seen through the window following the crimping of the connector body about the wire and so that a position of the wire along the length of the connector body can be visually confirmed through the window following the crimping of the connector body about the wire; and wherein the lanyard assembly defines an abutment surface disposed within the hollow interior of the connector body and against which an end of the inserted wire is positionable for limiting the distance that the wire can be inserted endwise into the hollow interior of the connector body, and the window is disposed at a location along the length of the connector body to permit the user to visually determine whether the end of the inserted wire is positioned adjacent the abutment surface; and wherein the window opens into the hollow interior of the connector body adjacent the abutment surface.

2. The improvement as defined in claim 1, wherein the connector body defines a bore of circular cross section which extends between the exterior surface and the hollow interior of the connector body, and the bore provides the window-providing passageway.

3. The improvement as defined in claim 1, wherein the window is disposed within about 0.125 inches from the abutment surface.

4. The improvement as defined in claim 1, wherein the connector body defines a plurality of projections disposed across the hollow interior prior to the insertion of the wire into the hollow interior so that when the connector body is crimped about the inserted wire, the plurality of projections of the connector body bite into the wire and thereby enhance a grip of the crimped connector body about the inserted wire and wherein the plurality of projections do not prohibit a withdrawal of the wire from the hollow interior of the connector body after the wire has been inserted into the connector body and before the connector body has been crimped about the wire.

5. The improvement as defined in claim 4, wherein the hollow interior includes a coarse surface having a plurality of coarse projections disposed thereacross, and the plurality of coarse projections of the coarse surface provide the plurality of the projections of the connector body.

6. The improvement as defined in claim 1, wherein the connector body has a plurality of projections disposed across the interior surfaces of the hollow interior prior to insertion of the wire into the hollow interior and wherein the plurality of projections face inwardly of the hollow interior so that when the connector body is subsequently crimped about the inserted wire, the interior surfaces of the hollow interior are mashed against the exterior surface of the wire so that the projections bite into the wire and thereby enhance the grip of the crimped connector body about the inserted wire; and
 wherein the hollow interior includes a coarse surface having a plurality of coarse projections disposed thereacross, and the plurality of coarse projections of the coarse surface provide the plurality of the projections of the connector body.

7. The improvement as defined in claim 6, wherein the coarse surface of the hollow interior includes a series of internal threads having edges, and the plurality of projections of the coarse surface are provided by the edges of the internal threads.

8. The improvement as defined in claim 6, wherein the hollow interior of the connector body has a section which extends therealong from the end opening thereof, and said section includes a series of internal threads provided with edges, and the projections of the coarse surface are provided by the edges of the internal threads.

9. A crimp-on single-use lanyard assembly utilized for pulling upon one end of a wire, the lanyard assembly comprising:
 a cord portion; and
 a wire-accepting connector which is connected to the cord portion, the connector including an elongated body having two opposite ends and having a hollow interior including an end opening which opens out of the body at one end thereof and into which a wire is inserted endwise into the hollow interior of the connector body through the end opening thereof to a position therein at which the wire end is fully accepted by the connector body for purposes of crimping the connector body about the wire, wherein the crimping of the connector body about the wire alters a shape of the connector body from an undeformed condition to a deformed condition; and
 the connector body includes a longitudinal axis and defines an exterior surface which extends along a length of the connector body from the end opening thereof and includes a window which extends from the hollow interior of the connector body and opens out of the exterior surface thereof and through which a user can visually determine whether the wire has been inserted endwise into the interior of the connector body to a desirable position therealong which is situated close to the position at which the end of the wire is fully accepted by the connector body as aforesaid so that after inserting the wire endwise into the connector body through the end opening thereof and before the connector body is crimped about the inserted wire, the user can visually confirm whether the wire has been inserted endwise into the interior of the connector body to the desirable position;
 wherein the window is provided by a passageway which communicates between the exterior surface and the hollow interior of the connector body, and the window-providing passageway is disposed along the length of the connector body at a location along the length of the connector body which is capable of being crimped about the wire, is spaced from the end opening by a predetermined distance and is of such a configuration that the wire can be seen through the window-providing passageway when the wire has been inserted through the end opening and along the hollow interior of the connector body by a distance which is at least as great as the predetermined distance and wherein the connector body is adapted to cooperate with the wire when the connector body is crimped thereabout so that the wire and the connector body are prevented from being rotated relative to one another; and
 wherein the hollow interior of the connector body is sized to closely accept the wire inserted endwise therein through the end opening of the connector body so that upon the crimping the connector body to the deformed condition about the wire to thereby secure the wire within the connector body, neither the exterior surface of the connector body nor the window is deformed to such an extent that the wire cannot be seen through the window following the crimping of the connector body about the wire and so that a position of the inserted wire along the length of the connector body can be visually confirmed through the window following the crimping of the connector body about the wire; and
 wherein the lanyard assembly defines an abutment surface disposed within the hollow interior of the connector body and against which an end of the inserted wire is positionable for limiting the distance that the wire can be inserted endwise into the hollow interior of the connector body, and the window is disposed along the length of the connector body to permit the user to visually determine whether the end of the inserted wire is positioned adjacent the abutment surface; and
 wherein the window opens into the hollow interior of the connector body adjacent the abutment surface.

10. The lanyard assembly as defined in claim 9, wherein the connector body defines a bore of circular cross section which extends between the exterior surface and the hollow interior of the connector body, and the bore provides the window-providing passageway.

11. The lanyard assembly as defined in claim 9, wherein the window is disposed within about 0.125 inches from the abutment surface.

12. The lanyard assembly as defined in claim 9, wherein the connector body defines a plurality of projections disposed across the surface of the hollow interior prior to insertion of the wire into the hollow interior so that when the connector body is crimped about the inserted wire, the plurality of projections of the connector body bite into the wire and thereby enhance a grip of the crimped connector body about the inserted wire and wherein the plurality of projections do not prohibit a withdrawal of the wire from the hollow interior of the connector body after the wire has been inserted into the connector body and before the connector body has been crimped about the wire.

13. The improvement as defined in claim 12, wherein the hollow interior includes a coarse surface having a plurality of coarse projections disposed thereacross, and the plurality of coarse projections of the coarse surface provide the plurality of the projections of the connector body.

\* \* \* \* \*